United States Patent
Fontecchio

(10) Patent No.: US 9,614,814 B2
(45) Date of Patent: Apr. 4, 2017

(54) SYSTEM AND METHOD FOR CASCADING TOKEN GENERATION AND DATA DE-IDENTIFICATION

(71) Applicant: Management Science Associates, Inc., Pittsburgh, PA (US)

(72) Inventor: Tony Fontecchio, Irwin, PA (US)

(73) Assignee: Management Science Associates, Inc., Pittsburgh, PA (US)

( * ) Notice: Subject to any disclaimer, the term of this patent is extended or adjusted under 35 U.S.C. 154(b) by 0 days.

(21) Appl. No.: 15/046,202

(22) Filed: Feb. 17, 2016

(65) Prior Publication Data
US 2016/0182231 A1 Jun. 23, 2016

Related U.S. Application Data

(63) Continuation of application No. 14/291,805, filed on May 30, 2014, now Pat. No. 9,292,707.
(Continued)

(51) Int. Cl.
| | |
|---|---|
| H04L 9/32 | (2006.01) |
| H04L 29/06 | (2006.01) |
| H04L 9/06 | (2006.01) |
| G06F 21/62 | (2013.01) |
| H04L 9/14 | (2006.01) |
| H04L 9/30 | (2006.01) |

(52) U.S. Cl.
CPC ...... *H04L 63/0421* (2013.01); *G06F 21/6254* (2013.01); *H04L 9/0643* (2013.01);
(Continued)

(58) Field of Classification Search
CPC ............ H04L 63/0807; H04L 63/0876; H04L 9/0643; H04L 63/0474; H04L 63/0421;
(Continued)

(56) References Cited

U.S. PATENT DOCUMENTS

| | | |
|---|---|---|
| 6,397,224 B1 | 5/2002 | Zubeldia et al. |
| 6,732,113 B1 | 5/2004 | Ober et al. |

(Continued)

OTHER PUBLICATIONS

Bouzelat et al. NPL 1996—Extraction and Anonymity Protocol of Medical file.*

(Continued)

*Primary Examiner* — Kaveh Abrishamkar
*Assistant Examiner* — Tri Tran
(74) *Attorney, Agent, or Firm* — The Webb Law Firm

(57) ABSTRACT

A computer-implemented method for de-identifying data by creating tokens through a cascading algorithm includes the steps of processing at least one record comprising a plurality of data elements to identify a subset of data elements comprising data identifying at least one individual; generating, with at least one processor, a first hash by hashing at least one first data element with at least one second data element of the subset of data elements; generating, with at least one processor, a second hash by hashing the first hash with at least one third data element of the subset of data elements; creating at least one token based at least partially on the second hash or a subsequent hash derived from the second hash, wherein the token identifies the at least one individual; and associating at least a portion of a remainder of the data elements with the at least one token.

20 Claims, 6 Drawing Sheets

Related U.S. Application Data

(60) Provisional application No. 61/830,345, filed on Jun. 3, 2013.

(52) U.S. Cl.
CPC ............... *H04L 9/14* (2013.01); *H04L 9/30* (2013.01); *H04L 9/3234* (2013.01); *H04L 9/3239* (2013.01); *H04L 63/0442* (2013.01); *H04L 63/0807* (2013.01); *H04L 63/0876* (2013.01); *H04L 2209/42* (2013.01); *H04L 2463/062* (2013.01)

(58) Field of Classification Search
CPC . G06F 19/322; G06F 21/6245; G06F 21/6254
See application file for complete search history.

(56) References Cited

U.S. PATENT DOCUMENTS

| | | |
|---|---|---|
| 7,200,578 B2 | 4/2007 | Paltenghe et al. |
| 7,280,663 B1 * | 10/2007 | Golomb ............... H04L 9/3066 380/255 |
| 7,376,677 B2 | 5/2008 | Ober et al. |
| 7,865,376 B2 | 1/2011 | Ober et al. |
| 8,473,452 B1 | 6/2013 | Ober et al. |
| 8,930,404 B2 | 1/2015 | Ober et al. |
| 2008/0147554 A1 * | 6/2008 | Stevens ................ G06F 19/322 705/51 |

OTHER PUBLICATIONS

Bouzelat et al., Extraction and Anonymity Protocol of Medical File, Department of Medical Informatics (Pr. L. Dusserre), Teaching Hospital of Dijon France, AMIA, Inc., 1996, pp. 323-327.

Fraser et al., Tools for De-Identification of Personal Health Information, Prepared for the Pan Canadian Health Information Privacy (HIP) Group, Sep. 2009, 40 pages.

Kunitz et al., Record Linkage Methods Applied to Health Related Administrative Data Sets Containing Racial and Ethnic Descriptors, Record Linkage Techniques, 1997, pp. 295-304.

Scheuren, Linking Health Records: Human Rights Concerns, Record Linkage Techniques, 1997, pp. 404-426.

\* cited by examiner

SYSTEM AND METHOD FOR CASCADING TOKEN GENERATION AND DATA DE-IDENTIFICATION

CROSS REFERENCE TO RELATED APPLICATIONS

This application is a continuation of U.S. patent application Ser. No. 14/291,805, filed May 30, 2014, which claimed the benefit of U.S. Provisional Application No. 61/830,345, filed on Jun. 3, 2013, the entire disclosures of each of which are hereby incorporated by reference.

BACKGROUND OF THE INVENTION

Field of the Invention

The present invention relates generally to data de-identification and, in particular, a system and method for de-identifying data using cascading token generation.

Description of Related Art

For decades, data including personally-identifying information has been de-identified through the creation of tokens that uniquely identify an individual. This technology has been used in connection with consumer package goods data, television data, subscriber data, healthcare data, and the like. Traditionally, methods for creating tokens for a specific record associated with an individual involved concatenating selected data elements into a string, and then encrypting that string to form a token. However, there are scenarios in which concatenated substrings will yield less than optimal results. Advances in computing power now allow for token generation to be complex, even across large volumes of data, providing for enhanced data security. Moreover, once a token is created, additional security measures are desirable to prevent reverse-engineering through statistical analysis attacks.

By law, Protected Healthcare Information (PHI) cannot be freely disseminated. However, if properly de-identified to the point where the risk is minimal that an individual could be re-identified, the PHI can be disclosed by a covered entity or an entity in legal possession of PHI.

SUMMARY OF THE INVENTION

Generally, it is an object of the present invention to provide a system and method for de-identifying data that overcomes some or all of the above-described deficiencies of the prior art.

According to a preferred embodiment, provided is a computer-implemented method for de-identifying data by creating tokens through a cascading algorithm, comprising: processing at least one record comprising a plurality of data elements to identify a subset of data elements comprising data identifying at least one individual; generating, with at least one processor, a first hash by hashing at least one first data element with at least one second data element of the subset of data elements; generating, with at least one processor, a second hash by hashing the first hash with at least one third data element of the subset of data elements; creating at least one token based at least partially on the second hash or a subsequent hash derived from the second hash, wherein the token identifies the at least one individual; and associating at least a portion of a remainder of the data elements of the plurality of data elements with the at least one token.

According to another preferred embodiment, provided is a system for de-identifying data, comprising: a data supplier computer comprising at least one processor and a de-identification engine, the de-identification engine configured to: (i) process a data record comprising a plurality of data elements, wherein a subset of data elements of the plurality of data elements comprises identifying information; (ii) generate a token based at least partially on a series of hashes of individual data elements of the subset of data elements, wherein a plurality of hashes in the series of hashes are based at least partially on a previous hash in the series of hashes; (iii) encrypt at least the token to generate an encrypted token; (b) a data processing entity computer remote from the data supplier computer, the data processing computer comprising at least one processor configured to: (i) receive the encrypted token and unencrypted data elements from the data supplier computer; (ii) decrypt the encrypted token, resulting in the token; (iii) link the token and unencrypted data elements with at least one other record based at least partially on the token.

According to a further preferred embodiment, provided is a de-identification system, comprising: a de-identification subsystem comprising at least one computer-readable medium containing program instructions which, when executed by at least one remote processor at a data supplier, causes the at least one remote processor to: create a token from at least one record, the token created by performing at least one hash operation on at least one data element of at least one record, wherein the at least one data element comprises personally-identifying information; encrypt the token with a randomly-generated encryption key, forming an encrypted token; and encrypt the encrypted token and the randomly-generated encryption key with a public key, forming encrypted data; and a record processing subsystem comprising a server and at least one computer-readable medium containing program instructions which, when executed by at least one processor, causes the at least one processor to: receive the encrypted data; decrypt the encrypted data with a private key corresponding to the public key, resulting in the randomly-generated encryption key and the encrypted token; and decrypt the encrypted token with the randomly-generated encryption key.

According to another preferred embodiment, provided is a de-identification engine for de-identifying at least one record comprising a plurality of data elements, wherein a subset of the plurality of data elements comprise personally-identifying data, the de-identification engine comprising at least one computer-readable medium containing program instructions that, when executed by at least one processor of at least one computer, cause the at least one computer to: (a) generate an initial hash by hashing at least one key and a first data element of the subset of data elements; (b) generate a next hash by hashing a next data element of the subset of data elements with a previous hash value generated by hashing at least a previous data element of the subset of data elements; and (c) repeat step (b) for all data elements of the subset of data elements, resulting in a final hash value.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE PREFERRED EMBODIMENTS

Figure 1:
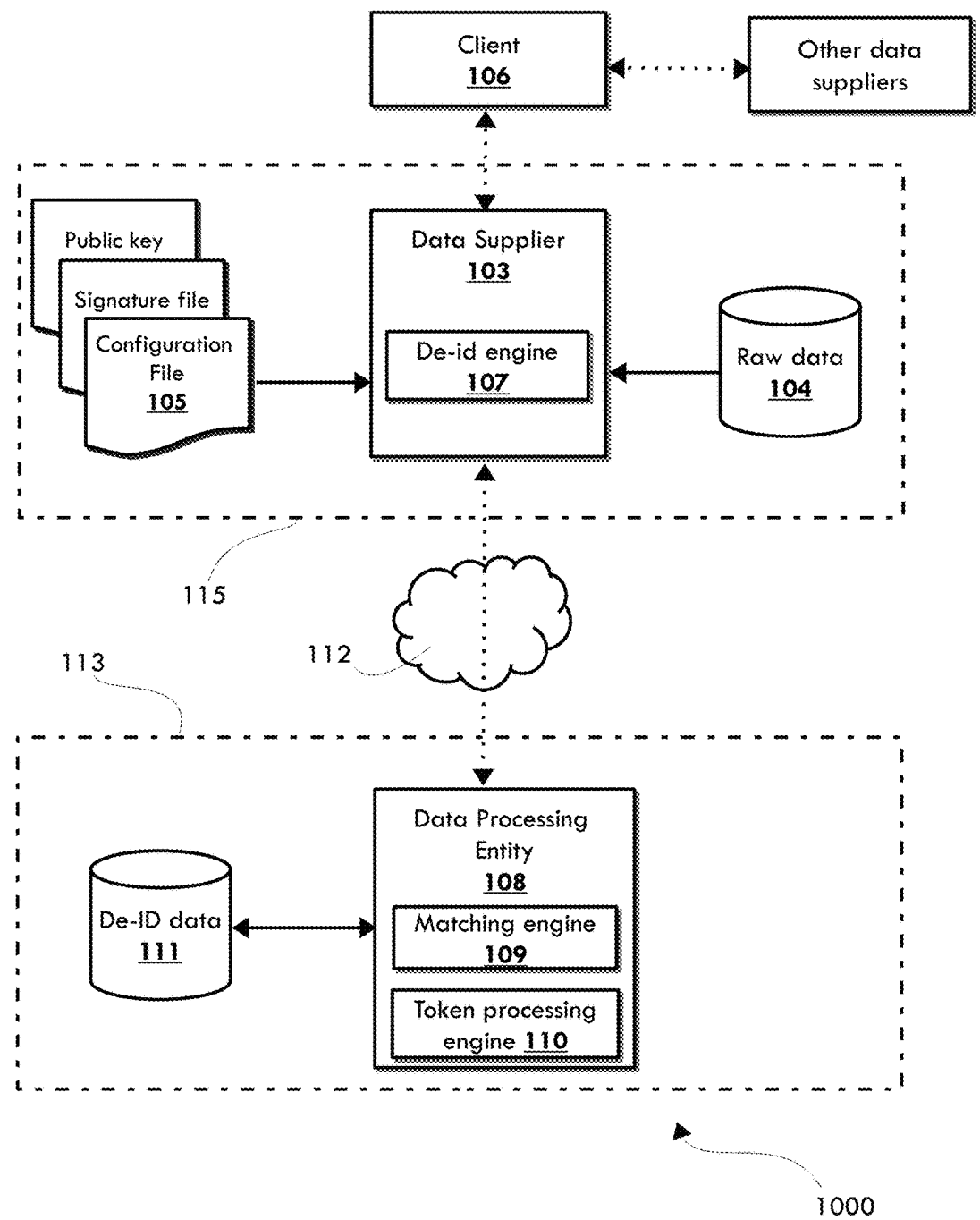
FIG. 1 is a schematic diagram for a system for de-identifying data according to the principles of the present invention.

For purposes of the description hereinafter, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. It will be appreciated that numerous other arrangements are possible.

In a preferred and non-limiting embodiment of the present invention, provided is a system for de-identifying data that includes a de-identification engine configured to hash personally identifying data within a data record, while at the same time passing through non-identifying data (e.g., a refill number and/or the like). In this way, the system has the ability to perform data cleansing operations (e.g., justification, padding, range checking, character set validation, date cleaning, zoned decimal conversion, and/or the like), data derivation (e.g., ages, combinations of fields, and/or the like), and/or data translation (e.g., state abbreviations to state names, or the like). Various other formatting and normalization functions are also possible.

To create a unique identifier for an individual (i.e., a patient, a consumer, or the like), the de-identification engine of the present invention may support configurable standardization and hashing of fields. By using multiple fields to create a unique identifier, the system of the present invention ensures that statistical analysis or other reverse-engineering techniques cannot be performed on the hashed values to determine a person's identity. For example, applying a hashing algorithm (e.g., SHA-3 or other hashing algorithms) to the first name "John" will produce a secure token that cannot be reversed back to the name "John," but potentially allows for a statistical analysis operation to be performed to determine that the most frequent first name hash token represents the name "John." A similar analysis could be performed on other non-unique fields as well. For that reason, multiple fields are used to create a distinct (or sufficiently distinct) de-identification value. For example, using a first name, last name, date of birth, and zip code may be considered sufficiently distinct to prevent statistical cracking.

Referring now to FIG. 1, a system 1000 for de-identifying data is shown according to a preferred and non-limiting embodiment. A data supplier 103 is in communication with a raw data storage unit 104, which may include one or more data storage devices. The raw data storage unit 104 may comprise one or more data structures, such as tables, databases, and/or the like, including records personally identifying individuals. The data supplier 103 includes one or more computers, such as servers, user terminals, processors, and/or the like, and a de-identification engine 107 that executes on one or more of the data supplier 103 computers. The de-identification engine 107 may include compiled program instructions capable of being executed on a data supplier 103 computer and configured to process data records from the raw data storage unit 104. The data supplier 103 is also given access to a configuration file 105, a signature file, and a public key for use in the de-identification process. The data supplier 103 may be one of many data suppliers associated with a particular client 106, and multiple clients may each be associated with multiple data suppliers. It will be appreciated that other arrangements are possible.

With continued reference to FIG. 1, a data processing entity 108 is shown in communication with the data supplier 103 through a network environment 112, such as the Internet or any direct or indirect network connection. The data processing entity 108 is in communication with a de-identification data storage unit 111 and includes one or more computers capable of executing a matching engine 109 and a token processing engine 110. The matching engine 109 and/or token processing engine 110 may include compiled program instructions capable of being executed on a data processing entity 108 computer. The token processing engine 110 may be configured to receive output from the data supplier 103 and, as explained further below, perform additional operations on the token or encrypted output such as, but not limited to, decrypting encrypted output data and hashing the token generated by the de-identification engine 107 with a seed/key unique to the client 106 and/or data supplier 103 to produce a new token.

Still referring to FIG. 1, the matching engine 109 may be configured to match tokens among de-identified records, received from the data supplier 103, with other records in the de-identification data storage unit 111. For example, the matching engine 109 may use the tokens generated or output by the de-identification engine 107, or the new tokens generated or output by the token processing engine, to match the records received with a unique individual, and to link the record to that individual. The de-identification data storage unit 111 may include one or more data storage devices that comprise one or more data structures such as tables, databases, and/or the like. The system 1000 is distributed such that the data supplier is in a location 115 remote from a location 113 of the data processing entity 108. In this way, the raw data can be de-identified.

In a preferred and non-limiting embodiment, a cascading hash process is used to generate a de-identified token. A cascading hash process may increase token security against attacks from crackers and hackers. Instead of concatenating multiple fields, adding a secret seed, and then hashing to form a token, the cascading hash process forms a token through a series of hashes involving each individual field. This polyphasic operation works by hashing data fields or elements of a record individually in a chain, such that each subsequent hash depends upon a previous hash result.

Figure 2A:
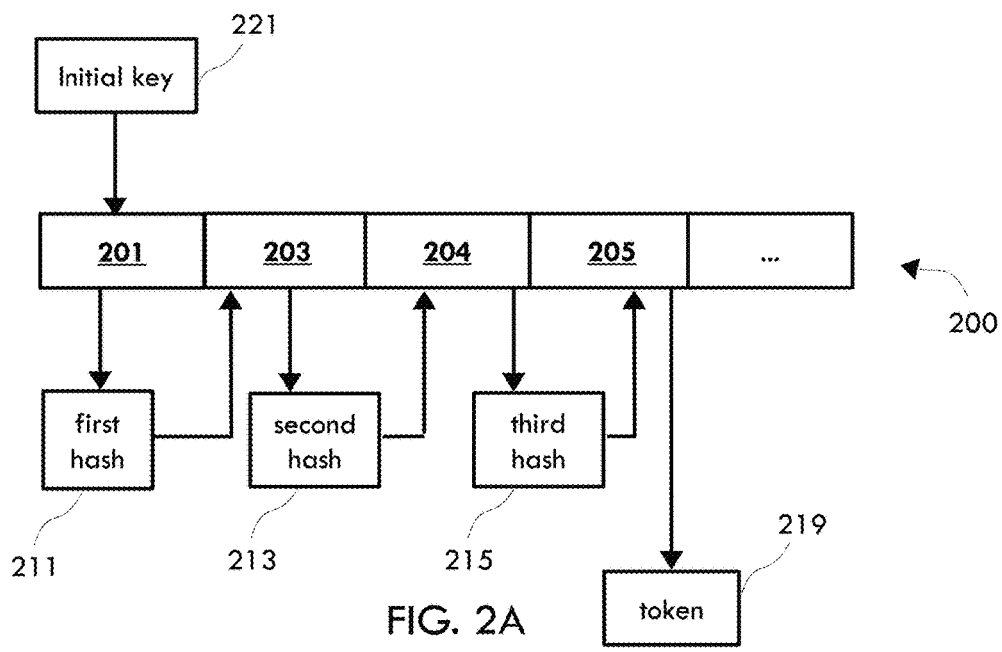
FIGS. 2A-2C are schematic diagrams for a cascading hash process for de-identifying data according to the principles of the present invention.
Figure 2B:
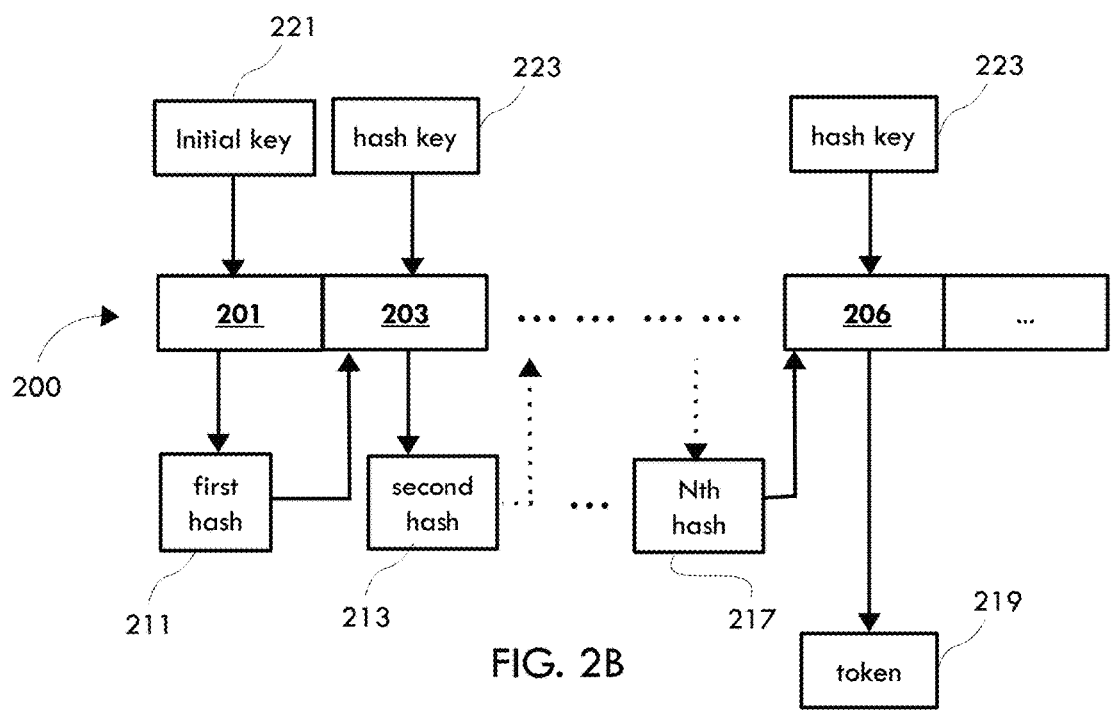
Figure 2C:
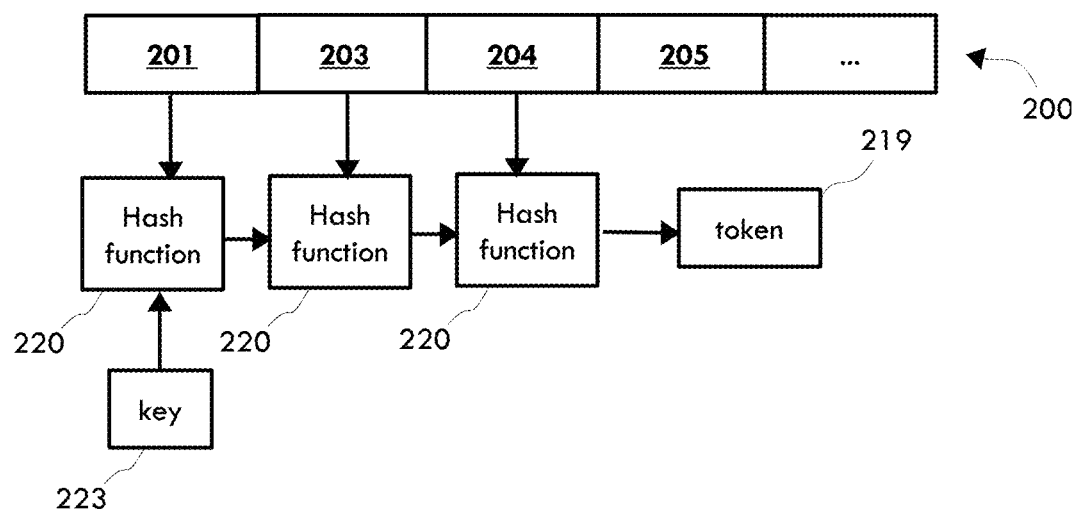

Referring now to FIGS. 2A-2C, a cascading hash process is depicted according to a preferred and non-limiting embodiment. A record 200 containing a number of data fields or elements 201, 203, 204, 205 that include identifying data is provided. Once these data fields or elements are identified, generally with business rules customized to a particular data supplier, the token creation process is started. Referring specifically to FIG. 2A, an initial key 221 is hashed with a first data field 201 to produce a first hash 211. The first hash 211 is then hashed with a second data field 203 to produce a second hash 213. The second hash 213 is then hashed with a third data field 204 to produce a third hash 215. This process may continue for as many data fields as required, resulting in a hashed token 219 derived directly from the last hashed data field and, as a result of the cascade, derived indirectly from the first hash 211, second hash 213, and any intervening hashes. In the example shown in FIG. 2A, the fourth data field 205 is hashed with the third hash 215 to produce the token 219.

With continued reference to FIGS. 2A-2C, it will be appreciated that the hash function 220 (shown in FIG. 2C) may include other inputs, keys, and/or the like, in addition to a previous hash result. For example, in the non-limiting example shown in FIG. 2B, an initial key 221 is used to hash the first data field 201, and subsequent data fields 203, 206 are hashed with a previous hashed value as well as a hash key 223. In this example, the second data field 203 is hashed with the first hash 211 and the hash key 223 as inputs to a hashing function that results in the second hash 213. Depending on the number of data fields used, generally as defined by the business rules for a particular data source, the process may be repeated. As shown in FIG. 2B, the Nth hash 217 is derived from the sequence of hashes preceding it and is used, along with hash key 223, to hash the Nth+1 data field 206 to create the token 219.

Due to the nature of the cascading process, the final token 219 produced is unique for the data fields 201, 203, 206 but, unlike traditional concatenation-based methods, is not merely a hashed version of all of the data fields combined. Rather, with the cascading token generation process, a nested or cascaded token is produced that can only be derived from the series of hashes and data fields in a record 200. In the non-limiting embodiment shown in FIG. 2B, for example, an initial key 221 may differ from a hash key 223 used in subsequent iterations of the sequence. However, it will be appreciated that the hash key 223 and the initial key 221 may be the same and, in some embodiments, further hash keys 223 may not be used after the initial key 221. Those skilled in the art will appreciate that various other arrangements are possible.

Referring to FIG. 2C, a cascading hash process is shown according to a further preferred and non-limiting embodiment. The hash function 220, not separately shown in FIGS. 2A-2B, is depicted in FIG. 2C as receiving inputs and outputting results. The hash function 220 takes, as inputs, a key 223 and a first data field 201. The output of the hash function 220 in this example is input back into itself (i.e., recursively) along with a second data field 203. Similarly, the next output of the hash function 220 is input back into the hash function 220 again, along with a third data field 204. This is repeated as many times as necessary, depending on how many data fields 201, 203, 204, 205 will be used in creating the token 219. The final hash results in the token 219. It will be appreciated that the key 223, or a different key, may also be used as inputs to subsequent iterations of the hash function 220.

Referring to FIGS. 1 and 2C, in a preferred and non-limiting embodiment, a SHA-3 algorithm is used as the hash function 220 to create tokens 219. However, through the use of the de-identification engine 107 and configuration file 105, new and/or different algorithms and methodologies may be easily implemented. To increase security and data quality, the SHA-3 hashing algorithm may be configured to return spaces (fixed output) or null (delimited output) instead of a hash value if any of the component fields are not populated or contain all spaces.

In a preferred and non-limiting embodiment, and with reference to FIG. 1, it is envisioned that many clients 106 may be licensed to use the de-identification engine 107, and that each client may have a number of data suppliers 103. Therefore, it is desirable to provide unique tokens for each of the clients 106 or, in other embodiments, each of the data suppliers 103. This uniqueness may be provided, at least in part, through the use of the configuration file 105. In particular, the configuration file 105 may include a client tag (e.g., a client code or client key) to use in the token creation process. The client tag may be combined, incorporated, XORed, or used as an input to a hashing function for each data field. Alternatively, the client tag may be used as the initial input (e.g., initial key) for the first hash operation, and subsequent hash operations may use the previous hash result.

Through the use of client-specific tags, data records processed for one client 106 will not produce the same tokens as identical data records processed for a different client. In a preferred and non-limiting embodiment, the client name is stored in the configuration file 105 and, based on the client name, the client tag is generated or created. In this way, the actual value being used as the client tag will not be discernable to the data supplier 103. However, it will be appreciated that the client name itself may be used as a key and that, in other embodiments, the client tag may be known by the data supplier 103. Other arrangements and configurations are possible.

In a preferred and non-limiting embodiment, and with continued reference to FIG. 1, once the de-identification engine 107 at the data supplier 103 creates a token, the token (as well as the remainder of the record) must then be transmitted to the data processing entity 108 as one or more output files. To do so, further layers of encryption (e.g., token masking) may be provided. For example, the data supplier 103 may generate a transient encryption key and initialization vector unique to the session. The transient encryption key and initialization vector may be generated randomly in any number of ways. In a non-limiting embodiment, the transient encryption key may include a 128 bit key, and the encryption algorithm for the transient layer of encryption may include an Advanced Encryption Standard (AES) algorithm. However, various other arrangements, algorithms, and configurations are possible.

After encrypting the token with the transient encryption key, the encrypted token and the transient key may be encrypted together using, for example, a public key of the data processing entity 108 that corresponds to a private key held secretly by the data processing entity 108. In some non-limiting embodiments, the generated transient encryption key and initialization vector may be stored in a de-identification log file after being encrypted using the public key. Un-hashed output fields may remain unchanged so that the data supplier 103 is able to verify the content and verify that no personally identifiable data is being sent in the output files. Yet another layer of data security may be applied by transmitting the output files from the data supplier 103 to the data processing entity 108 over a secure transmission protocol such as SFTP or HTTPS, as examples.

Once the public key is used to encrypt the encrypted token, the transient key, and the initialization vector, the encrypted data is transmitted to the data processing entity 108 as one or more output files. Once received, the data processing entity 108 (and particularly the token processing engine 110 of the data processing entity 108) uses the private key corresponding to the public key used by the data supplier 103 to decrypt the last layer of encryption and to obtain the encrypted token, the transient key, and the initialization vector. The transient key is used to decrypt the encrypted token, resulting in the original token that resulted from the cascading hash process. Once the token 219 is obtained, the data processing entity 108 may perform an additional hash operation on the token 219 with a seed/key that is unique to either the client 106 or the data supplier 103 of the client 106. In some non-limiting embodiments, the data processing entity 108 may always perform the additional hash operation to distinguish between clients 106 and/or data suppliers 103, while in other embodiments this operation may not be performed. Thus, even if different clients or different data suppliers 103 were provided with the same data records, unique tokens would still exist at the data processing entity 108.

The transient encryption layer and public/private key encryption layer, provided by the token processing engine 110, add further security measures to prevent attacks. Since the transient key is randomly generated for each session, if someone were to intercept the encrypted data (the data encrypted with the public key), it would be difficult or impossible to reverse or crack, even with access to the de-identification engine 107. For example, if a hacker were to run a voluminous number of names through the engine 107 to try to match outputs, even identical sets of input data would result in different outcomes due to the transient layer of encryption using a random key value.

Figure 3A:
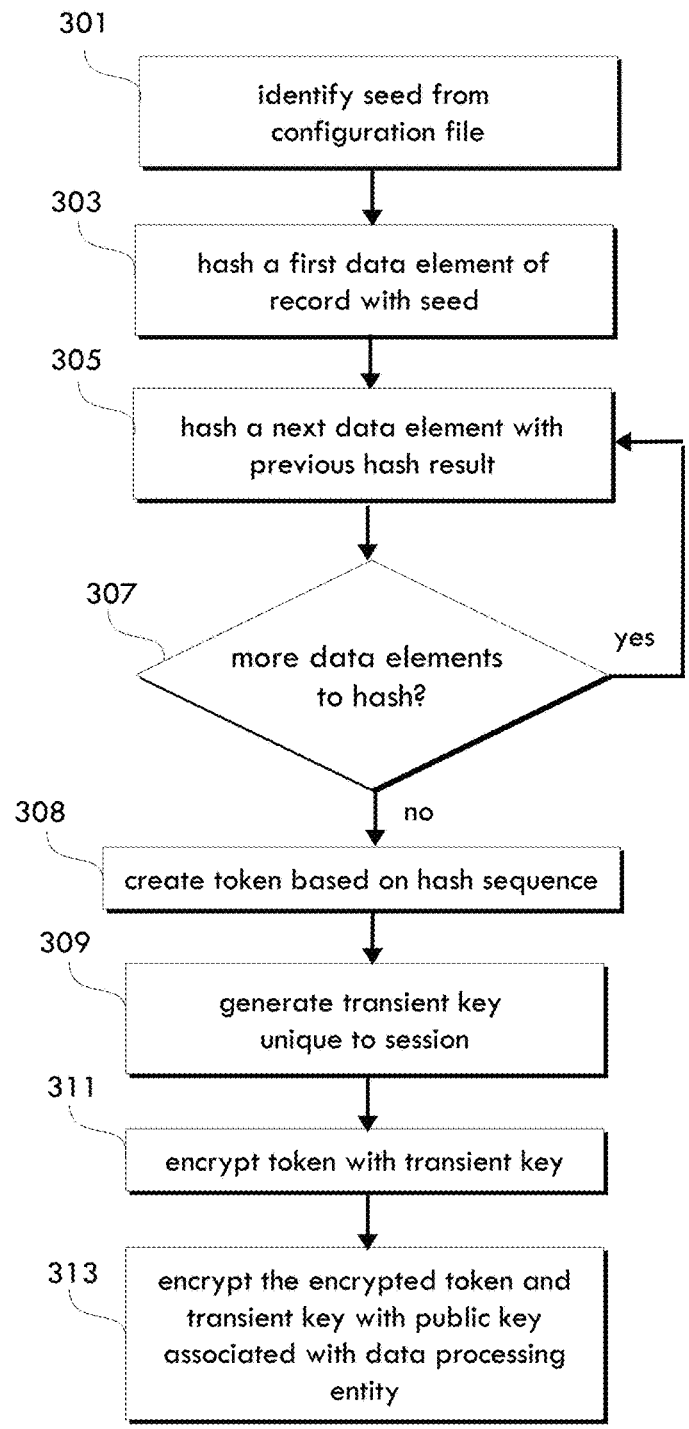
FIGS. 3A and 3B are flow diagrams for a system and method for de-identifying data according to the principles of the present invention.

Referring now to FIG. 3A, a step diagram is shown for the process that occurs at the data supplier according to a preferred and non-limiting embodiment of the present invention. At a first step 301, a seed or key is identified from a configuration file at the data supplier. Once the seed or key is identified, it is used to hash a first data field or element in a record during a next step 303. At step 305, the next data field or element is hashed with the previous hash result. Next, at step 307, it is determined whether there are further data fields or elements to hash. This may be based on business rules that are specific for a client or data supplier. If there are further data fields or elements to be incorporated into the token, the method loops back to step 305. Once all of the desired data fields or elements have been through the cascading hash process, the method proceeds to step 308 and the token is created. The token may be created as a result of a final hash result in step 305, or additional operations may be performed on the final hash result.

With continued reference to FIG. 3A, once a token is created at step 308, a transient key and/or an initialization vector is randomly generated for the session at step 309. The token is then encrypted with the randomized transient key and/or initialization vector at step 311. At step 313, the encrypted token is combined with the randomized transient key and/or initialization vector generated in step 309 and the combination is encrypted with a public key corresponding to a private key associated with the data processing entity.

Figure 3B:
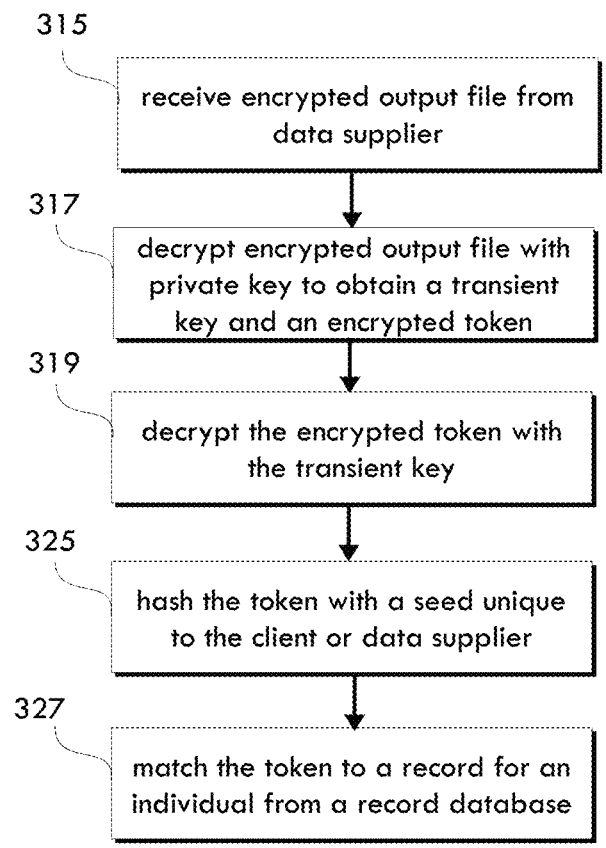

Referring now to FIG. 3B, a step diagram is shown for the process that occurs at the data processing entity according to a preferred and non-limiting embodiment of the present invention. At step 315, the data processing entity receives one or more output files from the data supplier over a secure network connection. Next, at step 317, a private key held secret by the data processing entity is used to decrypt the output files to obtain an encrypted token and the transient key and/or initialization vector. At step 319, the encrypted token is decrypted with the transient key and/or initialization vector. Once the token is obtained that was the result of the cascading hash process performed by the de-identification engine, at step 325 the token is then hashed with a seed that is unique to the data supplier or a client associated with the data supplier. This unique seed allows for differentiation between identical data records processed by different clients and/or data suppliers. At step 327, the token is used to match the record to an existing record in a database.

Figure 4:
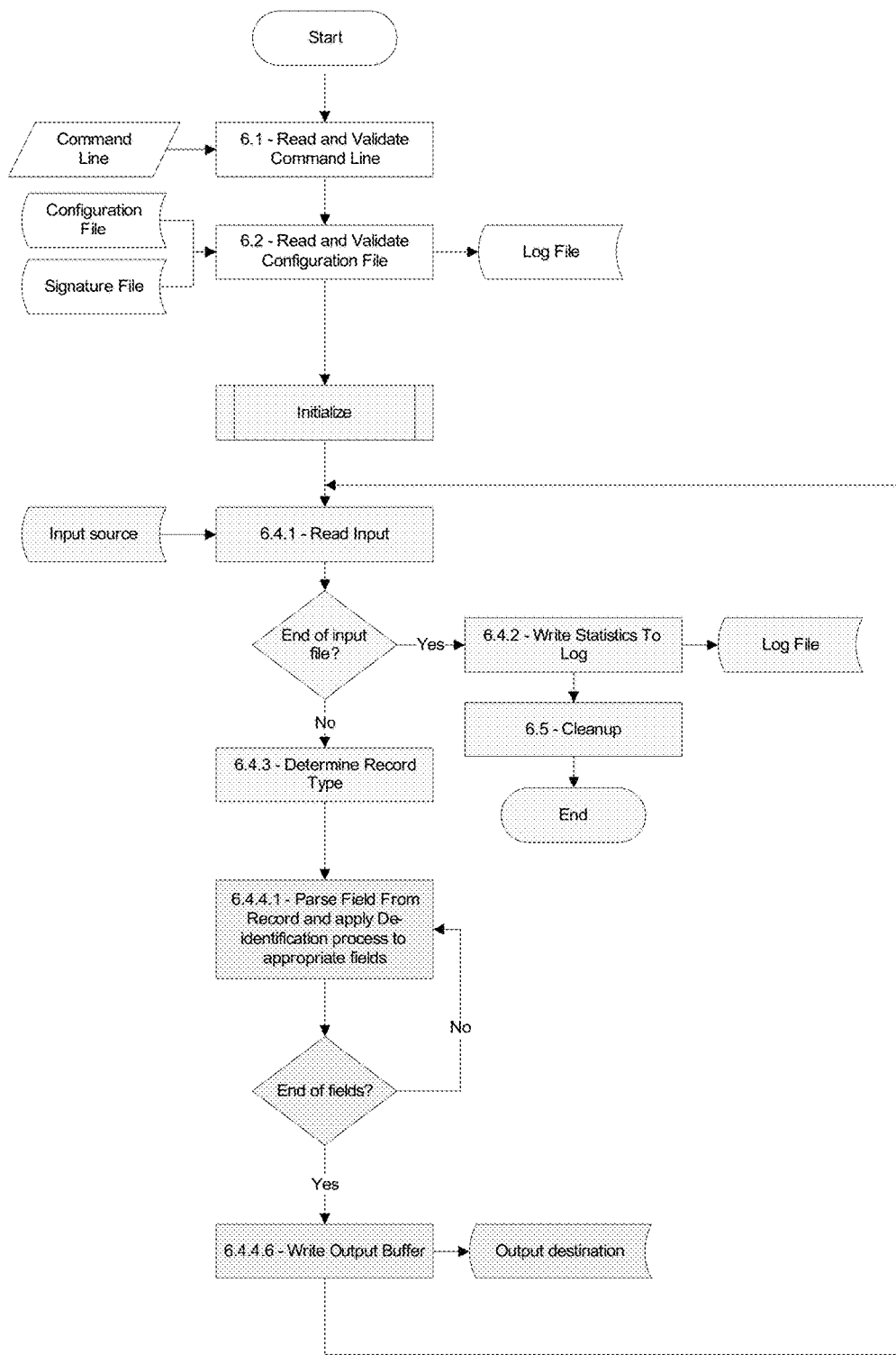
FIG. 4 is a further flow diagram for a system and method for de-identifying data according to the principles of the present invention.

Referring to FIG. 4, a further step diagram is shown according to a preferred and non-limiting embodiment. At 6.1, before any processing occurs, the parameters passed in on the command line may be validated. If any parameters are invalid, or required parameters are missing, the engine may display an error message and exit with a non-zero return code. The program will not stop at the first error—it will validate all parameters before exiting. At 6.2, each line of the configuration file may be validated for correct syntax. If it is invalid, the offending line and an error message will be written to the log file. The engine may be configured to not stop at the first error—rather, it may validate all lines before exiting. If any errors were found, the program will exit with a non-zero return code and will not process any data. A temporary key (e.g., transient key) for encrypting the tokens with AES in the output record will be generated during initialization. The key may be 128 bit, and a 128 bit initialization vector may also be generated. To enable the removal of the AES layer, the data processing entity may need to know the temporary key and the initialization vector, so both may be encrypted using RSA and a public key.

With continued reference to FIG. 4, the de-identification engine may have the ability to process files that contain a single record type (e.g., an RX data file) or multiple record types (e.g., a DX data file). In some implementations, all records may be required to end with either a line-feed or a carriage-return+line-feed combination. The de-identification engine may process both fixed-length and delimited input records. It is also possible to have the input file in one format and the output in a different format. At 6.4.1, the input records will be read in one at a time and processed through to the output. The input stream will be read until one of the following conditions is met: 6.4.2(Write Statistics To Log)—if there are no more records to process, the processing check information and run documentation are written to the log file; 6.4.3 (Determine Record Type)—if the configuration file defines a record type location, the record type of the current record has to be parsed out so that the appropriate rules can be executed. The configuration file will define information to enable this; (Process Fields)—the output record is built by processing each output record field defined in the configuration file; 6.4.4.1 (Parse Field Value From Input Record)—every output field definition refers to an input field; 6.4.4.2 (Execute Field Rules)—after the input field is extracted, the Field Rule functions will be applied to the field changing the value in the field as they execute; 6.4.4.3 (Write Final Value To Output)—after all Field Rules have been executed, the value remaining in the field will be appended to the output record; 6.4.4.4 (Add Checksum)—to guard against data tampering and transmission errors, a checksum will be incorporated in each record before it is output (the client tag may be part of the checksum; this security measure ensures that if a data supplier were to get another data supplier's output, they would not be able to identify the tokens); 6.4.4.5 (Compress Output)—if the compression option is enabled in the configuration file, the output buffer will be compressed; 6.4.4.6 (Write Output)— the contents of the output area will be written to the output medium. The record will be terminated with a line-feed character if the output was not compressed; 6.5 (Cleanup)— all keys stored in memory will be destroyed and the memory de-allocated before the program exits.

Referring again to FIG. 1, and according to a preferred and non-limiting embodiment, the configuration file 105 is a plain-text file and is used by the de-identification engine 107 in normal operation. The configuration file 105 may also be signed so that no modifications can be made to it, and to ensure its validity. The name of the configuration file 105 may be specified on the command line with the -c switch, as an example, although it will be appreciated that numerous other ways to reference the configuration file 105 are possible. In addition to the configuration file 105, a data supplier 103 may also be provided with a public key, a signature file, and any translation files that are needed. The public/private key pair may be generated by an engine configurator for each client. The private key will be used to digitally sign the signature file and the de-identification engine will use the public key to verify the digital signature. The public key may be delivered to each data supplier along with the signature file, configuration file, de-identification executable, and any translation files that are needed.

In a non-limiting embodiment, the signature file may be named similarly to the configuration file, with the addition of a ".sig" suffix (e.g., if the configuration file is named deid.cfg, the signature file will be named deid.cfg.sig). Further, the public key file may be named the same as the configuration file, with the addition of a ".pub" suffix (e.g., if the configuration file is named deid.cfg, the public key file will be named deid.cfg.pub). These naming configurations can be overridden on the command line. It will be appreciated that further variations are possible and that, in some embodiments, a signature file may not be used.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for de-identifying records received from a plurality of clients, each of the plurality of clients associated with a client tag unique to the client and a plurality of records including identifying data for a plurality of individuals, comprising:

receiving a record for an individual from at least one data storage device associated with a client, the record comprising a plurality of data elements identifying the individual;

generating, with at least one processor, a token based at least partially on the plurality of data elements and a client tag uniquely identifying the client among the plurality of clients;

creating, with at least one processor, a de-identified record comprising a portion of the record and the token;

matching, with at least one processor, the token or a new token based on the token to at least one other token in a database, the at least one other token generated based on the client tag and associated with at least one other de-identified record for the individual; and linking, with at least one processor, the de-identified record to the at least one other de-identified record in at least one data storage device.

2. The computer-implemented method of claim 1, wherein generating the token comprises hashing at least one data element of the plurality of data elements with the client tag uniquely identifying the client.

3. The computer-implemented method of claim 2, wherein hashing the at least one data element with the client tag comprises hashing the client tag with at least one of the following: a first data element of the plurality of data elements, each data element of the plurality of data elements, an initial token generated based at least partially on the plurality of data elements, or any combination thereof.

4. The computer-implemented method of claim 1, wherein generating the token comprises:

generating, with at least one processor, an initial token based at least partially on the plurality of data elements; and generating, with at least one processor, the token based at least partially on the initial token and the client tag.

5. The computer-implemented method of claim 1, wherein the token is generated based at least partially by combining, incorporating, XORing, and/or hashing the client tag with at least one data element of the plurality of data elements or a previous token generated based at least partially on at least one data element of the plurality of data elements.

6. The computer-implemented method of claim 1, wherein the client tag comprises a client name or is generated based at least partially on a client name.

7. The computer-implemented method of claim 6, further comprising identifying a configuration file associated with the client, the configuration file comprising the client name.

8. The computer-implemented method of claim 1, further comprising:

generating, with at least one processor, a checksum based at least partially on the client tag; and associating the de-identified record with the checksum.

9. The computer implemented method of claim 1, wherein the receiving, generating, and creating steps are performed on a data supplier computer, and wherein the matching and linking steps are performed by a data processing entity computer.

10. A computer program product for de-identifying records received from a plurality of clients, each of the plurality of clients associated with a client tag unique to the client and a plurality of records including identifying data for a plurality of individuals, comprising at least one non-transitory computer-readable medium comprising program instructions that, when executed by at least one processor, cause the at least one processor to:

receive a record for an individual from at least one data storage device associated with a client, the record comprising a plurality of data elements identifying an individual;

generate a token based at least partially on the plurality of data elements and a client tag uniquely identifying the client among the plurality of clients;

create a de-identified record comprising a portion of the record and the token;

match the token or a new token based on the token to at least one other token in a database, the at least one other token generated based on the client tag and associated with at least one other de-identified record for the individual; and link the de-identified record to the at least one other de-identified record in at least one data storage device.

11. The computer program product of claim 10, wherein the token is generated by hashing at least one data element of the plurality of data elements with the client tag uniquely identifying the client.

12. The computer program product of claim 11, wherein hashing the at least one data element with the client tag comprises hashing the client tag with at least one of the following: a first data element of the plurality of data elements, each data element of the plurality of data elements, an initial token generated based at least partially on the plurality of data elements, or any combination thereof.

13. The computer program product of claim 10, wherein generating the token comprises:

generating an initial token based at least partially on the plurality of data elements; and generating the token based at least partially on the initial token and the client tag.

14. The computer program product of claim 10, wherein the token is generated based at least partially by combining, incorporating, XORing, and/or hashing the client tag with at least one data element of the plurality of data elements or a previous token generated based at least partially on at least one data element of the plurality of data elements.

15. The computer program product of claim 10, wherein the client tag comprises a client name or is generated based at least partially on a client name.

16. The computer program product of claim 15, further comprising identifying a configuration file associated with the client, the configuration file comprising the client name.

17. The computer program product of claim 10, wherein the program instructions further cause the at least one processor to:

generate a checksum based at least partially on the client tag; and associate the de-identified record with the checksum.

18. The computer program product of claim 10, wherein the at least one non-transitory computer-readable medium comprises a first medium and a second medium, the first medium comprising a de-identification engine programmed to receive the record, generate the token, and create the de-identified record, the second medium comprising a matching engine programmed to match the token and link the record.

19. A system for de-identifying records received from a plurality of clients, each of the plurality of clients associated with a client tag unique to the client and a plurality of records including identifying data for a plurality of individuals, comprising:

(a) a data supplier computer comprising at least one processor and a de-identification engine, the de-identification engine configured to:

(i) receive a record for an individual from at least one data storage device associated with a client, the record comprising a plurality of data elements identifying an individual; and (ii) generate a token based at least partially on the plurality of data elements and a client tag uniquely identifying the client; and (b) a data processing entity computer remote from the data supplier computer, the data processing computer comprising at least one processor configured to:

(i) match the token or a new token based on the token to at least one other token in a database, the at least one other token generated based on the client tag and associated with at least one other de-identified record for the individual; and (ii) link a de-identified record comprising a portion of the record and the token to the at least one other de-identified record in at least one data storage device.

20. The system of claim 19, wherein at least one of the de-identification engine and the data processing entity computer is programmed or configured to create the de-identified record based at least partially on the portion of the record and the token.

* * * * *